Nov. 28, 1950 K. R. WENDT 2,531,544

TELEVISION IN NATURAL COLOR

Filed Nov. 7, 1946

INVENTOR
Karl R. Wendt
BY H. S. Grover,
ATTORNEY

Patented Nov. 28, 1950

2,531,544

UNITED STATES PATENT OFFICE 2,531,544

TELEVISION IN NATURAL COLOR

Karl R. Wendt, Hightstown, N. J., assignor to Radio Corporation of America, a corporation of Delaware Application November 7, 1946, Serial No. 708,210

16 Claims. (Cl. 178—5.4)

This invention relates to the reproduction of television images in their natural color, and more particularly to scanning sequence and associated color filters.

It is generally well known in the television art that the transmission of visual information by electricity is characterized by the fact that a single electrical transmission circuit can carry but one item of information at a time. Generally these items of information are conveyed by current impulses that are caused to flow through the transmission circuit.

By analyzing the image into its image elements and deriving therefrom a signal train of impulses by an orderly sequence of scanning, the image may be reproduced at a remote location by reconstruction of the image in the same orderly sequence of scanning. Since the scanning and the image repetition process are essentially artificial ones, the total number of scanning lines and the total number of image elements in each line, the sequence of transmission of the lines, the aspect ratio of the image and the rate of image repetition may be chosen arbitrarily.

Probably the simplest geometrical form that may be taken by the scanning pattern is the non-interlaced or "progressive" pattern formed by a single set of adjacent parallel traverses. This simple form of scanning is accomplished by beginning the scanning operation in the upper left-hand corner and scanning the total area of the image in a manner similar to the manner in which a page of a book is read. When the image has been completely scanned, the same process is repeated. The scanning agent is, of course, made inoperative during all retrace time intervals.

Probably the most objectionable features to the transmission of images in this manner are image flicker and image unsteadiness.

Because of the fact that the frequency band required to transmit a television image is proportional to the product of the image detail and the number of times per second the image area is completely scanned, it is necessary to determine the minimum image repetition rate which enables the optimum use of the frequency band for image detail and still provide an image repetition rate which is free from flicker.

An alternating current frequency of 60 cycles has become almost universally accepted as standard for commercial power supply in the United States. It therefore becomes extremely desirable that the sequence of scanning employed in the transmission of television images depend for synchronism between transmitter and receiver upon this frequency of 60 cycles per second. The image repetition rate may therefore be 60 per second or some integer sub-multiple of 60, such as 10, 15, 20, or 30. So far as continuity of motion in the image is concerned, it is probable that 15 or 20 would be high enough, although the motion picture standard is 24 per second. However, a much higher repetition rate is required in order to reduce image flicker to a satisfactory level. Since 60 has no integer sub-multiple between 30 and 60, it would seem that the adoption of an image repetition rate of 60 per second is required for operation without flicker from a 60 cycle power source. Increasing the image repetition rate to 60 per second may appear to give flicker elimination an advantage in the compromise with image detail, yet numerous tests have shown that 30 frames per second is distinctly unsatisfactory in regard to flicker.

Alternating current power operated receivers contain 60 cycle and 120 cycle disturbances in the direct voltage supplies which operate the receiver. Alternating current ripple in cathode ray television shows itself in several ways. When superimposed upon the deflection of the scanning beam, it produces wave edges in the case of horizontal deflection, and causes the non-uniform spacing of lines of the image in the case of vertical deflection. When the ripple exists in the cathode ray anode voltage supply, it alters the stiffness of the beam as regards deflection, and thereby modulates the deflecting influence of both the deflecting waves. It should be understood that these effects operate not only to distort the shape and intensity of the scanning pattern, but also cause the displacement of the details of the image. The presence of alternating current ripple in the video frequency amplifier causes the pattern to vary alternately in brightness from top to bottom of the image.

Whether the distortion produced is stationary or moving with respect to the scanning pattern is important in regard to the psychological effect on the observer. In the case of 30 frame per second progressive scanning, the ripple pattern is stationary and hence is much less objectionable than if it were moving. It will be seen that the ripple pattern is stationary because of the fact that 30 is a whole number sub-multiple of 60. However, in the case of 24 frame per second image as employed in the motion picture art, the alternate frames have distortion of opposite phase. This is true, since 60 divided by 24 is a whole number plus a half, which may be interpreted to mean that the ripple pattern passes over the scanning pattern twelve times per second.

At least a partial solution to the problem has been provided by interlaced scanning in which alternate lines are scanned in successive vertical deflection cycles.

Any one line is repeated only thirty times per second, but no line flicker is perceptible because of the extremely small area occupied by a single line and because of the small angle substended at the eye by a single line. Two or more alternate lines cannot cooperate to produce a 30 cycle flicker by combining their area, because if the eye includes more than one line, the intermediate lines will be unavoidably seen, and the eye is subjected to the 60 cycle alternating light effect, as produced by the image acting as a whole.

A slightly objectionable optical effect is noticeable in interlaced scanning images when objects in the scene move rapidly. If the motion is horizontal, the edges of the object appear to be jagged. This is due to the fact that a moving object is transmitted as a rapidly changing series of stills, and that each alternate still is composed of only one set of alternate lines, and that each still is slightly displaced horizontally with respect to the one preceding. On the other hand, the motion is actually portrayed more accurately by the 30 to 60 interlaced scanning than with 30 frame progressive scanning, since the moving object is shown in 60 positions per second instead of 30. This gain, however, is considered not to be of practical value.

When the object in the scene moves vertically, the apparent jagged edges of the object are not evidenced, but the entire object may appear to be transmitted by a system having only half the total number of lines. This loss of detail in a moving object is largely offset by the well known fact that moving objects require less resolution in order to be understood and that the eye cannot resolve minute detail in moving objects.

The effects of 60 cycle and 120 cycle ripple on 30 to 60 cycle interlaced scanning are very much the same as for 30 cycle progressive scanning. The lines are displaced, according to the sine law, horizontally and vertically. However, adjacent lines of the even and odd vertical deflections are all displaced similarly so that slight fixed distortion of the image is the only ill effect.

For a 24 to 48 cycle interlaced pattern, the odd and even lines will be displaced in opposite directions, thereby causing serious loss of detail. The effect of ripples in the 24 to 48 cycle patterns is further objectionable in that horizontal displacement of lines causes the objects in the transmitted scene to appear to have jagged edges. The vertical displacement causes severe pairing of the lines in certain portions of the image, thereby destroying the bunches of interlacing and causing these portions of the image to appear particularly coarse in structure by contrast with other portions.

It will be seen, therefore, that, other than detail, probably the most serious problems that are encountered in the reproduction of black and white images are flicker and image distortion caused by 60 cycle ripple. These can be satisfactorily solved for black and white image reproduction by employing interlaced scanning having a frame repetition frequency of 60 cycles per second.

It is well known that images in their natural color can be broken down into three component color images. The three separate component color images may then be transmitted and reconstructed into their original natural color at a remote location. As applied to the television art, an experimental color television system is shown and described in an article entitled "An experimental color television system" by R. D. Kell, G. L. Fredendall, A. C. Schroeder, and R. C. Webb, beginning on page 141 of the "RCA Review" for June, 1946.

The black and white television system may, for example, be converted into a natural color system by the addition of mechanically rotated tricolor filters placed in front of the image tubes and so arranged that when the observer is viewing the image on the kinescope or image producing tube through a red section of the filter in the receiver, the image orthicon or other television pickup tube is being exposed to the televized scene through a red section of the filter in the television camera. Similarly, when the blue and green filter sections in turn are in front of the kinescope, the blue and green sections are correspondingly in front of the pickup tube. The red, blue and green images are repeated frequently enough so that the three are superimposed by the persistence of vision of the observer additively to create the illusion of a single image in multiple colors.

Systems of this type have been proposed having operating standards employing 120 fields per second, 60 frames 2 to 1 interlaced, 525 lines, 40 single color fields, or 20 interlaced full color images per second. The color sequence is red, blue, green. With these operating standards, the resolution obtained with the overall system is about 250 lines.

Various other systems of scanning with various types of color filters have been proposed for the reproduction of natural color images by television. It has been proposed to arbitrarily divide the image element into a plurality of component color images in such a manner that the substantially square image element is divided into four substantially square sections, each of which represents one component color. It is proposed that the electron beam be projected onto the image element and caused to scan the element in the usual manner, which presumably relates to the popular type of interlaced scanning.

It has also been proposed that the image element be divided into rectangular segments, each representative of a component color, and that the scanning raster be such that all the different component color images will be traversed with each scanning line.

It has also been proposed to divide the image element into rectangular segments representative of the principal component colors and provide a local scanning circuit that operates at color field frequency. The scanning raster is displaced successively to scan completely each of the component color sections.

The average observer perceives flicker, when looking at a blank screen produced by a sequential color television receiver having a color field frequency of 120 per second from a viewing distance of four times the picture height, and at a brightness level of approximately 1 foot lambert. With a frequency of 144 color fields per second, this brightness increased to 2 foot lamberts, and with 180 color fields per second, to 10 foot lamberts. This last brightness is below the maximum brightness of the minimum performance kinescope. When an average scene is introduced, the critical flicker brightness level increases by a factor of 1.5.

The critical flicker brightness level increases approximately proportional to the viewing distance for picture sizes which do not require binocular retinal overlap.

It will be seen from the foregoing that the objectionable feature of flicker becomes more serious in the transmission of television images in their natural color.

According to this invention, a scanning pattern is provided wherein a developed ray traverses the image element along a series of substantially parallel paths and upon the completion of a predetermined number of parallel paths of traversal, additional series of substantially parallel paths are interlaced with respect to the first series of parallel paths until substantially the total area of the image element has been scanned. A color filter having a plurality of different component color sections is moved adjacent the image element in the same direction and at a rate equal to the displacement on the image element of each of said series of parallel paths with respect to the next previous series of parallel paths. This provides substantially simultaneous reproduction of at least one each of the component color images. A reduction in color flicker is therefore accomplished in two ways. All three of the component colors simultaneously appear on the image element. Although this feature does not largely contribute to the reduction of flicker, it produces an improved result. More important in the reduction of flicker is the fact that, according to this invention, a relatively short time interval is devoted to each component color and the change sequence of the different component colors is accomplished more rapidly than in accordance with the prior art of the transmission of television images in their natural color.

The 60 cycle ripple referred to above becomes particularly objectionable in the transmission of television images in their natural color because any lack of registration in the different component color images produces objectionable color fringes.

Color fringe distortion may be caused by 60 cycle ripple in the receiver power supply. The reason for this is that a 60 cycle interference produces a lack of registration of each of the component colors when the scanning sequence is such that all component color images do not properly coincide. According to this invention, the effective lack of registration between component color images is reduced to a minimum by employing diagonal scanning with an area repetition rate not greater than 60 cycles.

Another form of distortion in natural color image reproduction called the "color break" has been noticed in systems constructed in accordance with the teachings of the prior art. Color break is caused when the observer winks or moves his eyes during the interval allotted to the reproduction of a single component color image. It can be seen that the elimination of one of the component color images from the composite image will produce a distorted color reproduction or an unbalanced color reproduction. According to this invention, the objectionable feature of the color break is eliminated because of the fact that, as explained above, the time interval allotted to each component color is extremely small, and it is likely that the natural blinking of an eye would occupy a number of such time intervals.

If a relatively large time interval is allotted to each color, there will be a "color break up" due to motion of the object. Such break up is in effect caused by lack of registration by reason of the same element of an image being in different locations during each component color scanning. Such distortion is reduced by the practice of this invention.

It will be understood that the provision of diagonal scanning in accordance with the practice of this invention causes less low frequency components in the image signal. An explanation of this characteristic will be more clear when an average scene or image is analyzed. It very often happens that an upper or lower portion of an image is composed of elements having substantially the same light values. A typical example is that of an outdoor scene including a sky either totally overcast or with no clouds. It will be seen that, if a simple interlace having a ratio of 2 to 1 is employed, a large number of the scanning traverses will cover the upper portion of the image area before image elements having other light intensities are scanned. In accordance with this invention, very few scanning traverses will have been accomplished before the total height of the image area will have been partially scanned at least once. The usual wide vertical blanking pulse required in the practice of scanning in accordance with the prior art is not necessary in the practice of this invention. Low frequency components and wide vertical blanking pulses are extremely difficult to transmit by reason of the fact that is is difficult to transmit extremely low frequencies through video circuits and the poor operation of D.-C. restorers in the presence of large low frequency components and wide synchronizing impulses.

A further advantage obtained by the practice of this invention is attributed to a simpler vertical synchronization procedure. Magnetic scanning at a few thousand cycles is much simpler than magnetic scanning at a low frequency such as 30 or 60 cycles per second normally employed in television systems constructed in accordance with the teachings of the prior art.

It will be seen, therefore, that a system constructed in accordance with the teachings of this invention will provide an improvement in the transmission of images in their natural color with respect to the difficulties previously referred to of flicker, 60 cycle ripple, color break up, color fringes, and the difficulty of transmitting low frequency components of the image signal.

A primary object of this invention is to provide an improved natural color television system.

Another object of this invention is to reduce flicker in the reproduction of television images in their natural color.

Still another object of this invention is to reduce the distortion caused to television images by 60 cycle ripple in the receiving system.

Another object of this invention is to prevent color break in natural color television image reproduction because of the natural blinking or motion of the observer's eye.

Other and incidental objects of the invention will be apparent to those skilled in the art from a reading of the following specification and an inspection of the accompanying drawing in which Figure 1 illustrates in block diagram one preferred form of this invention;

Figures 1, 2, 3:
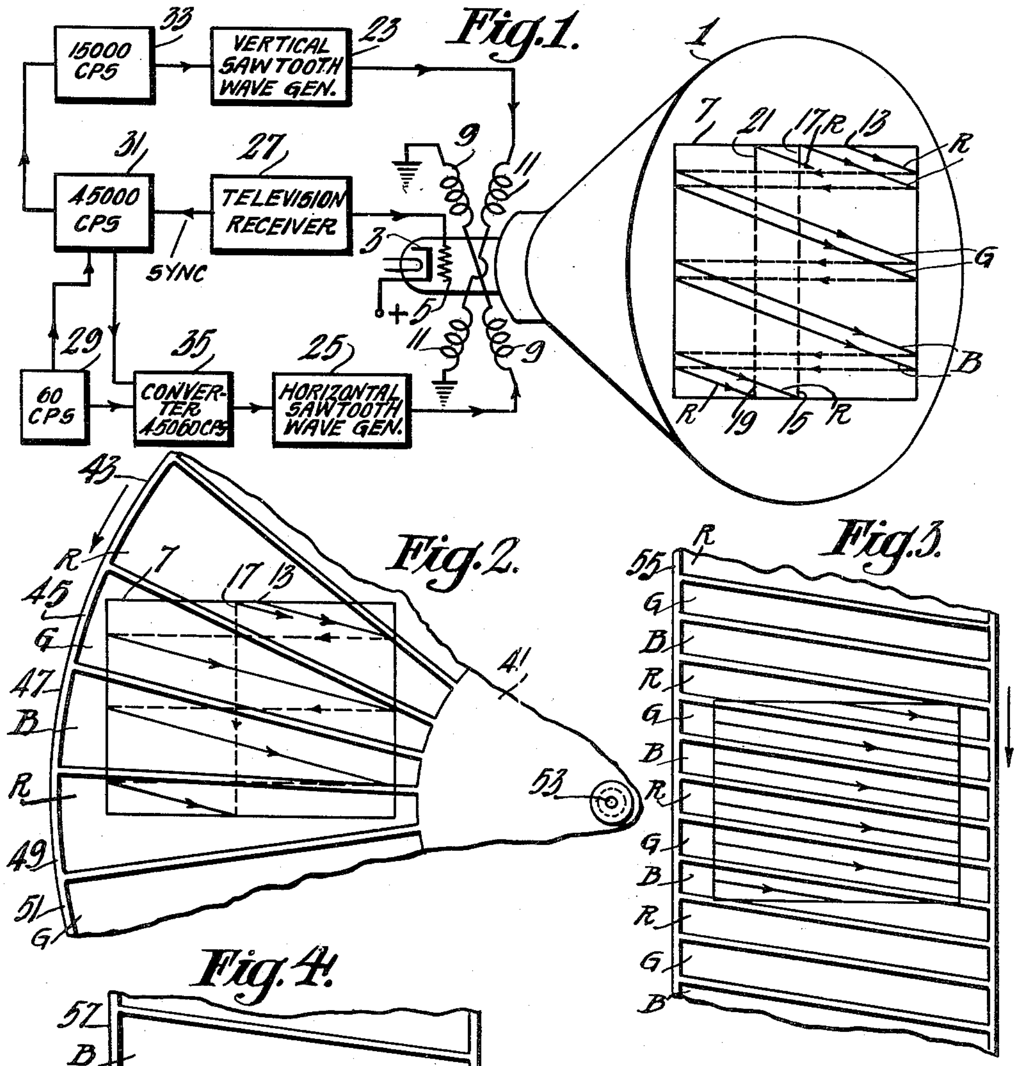
Figure 2 shows schematically a preferred form of this invention employing a disk type color filter.
Figure 3 represents schematically another preferred form of this invention employing a drum or ribbon type color filter.

Turning now in more detail to Figure 1, there is illustrated an image reproducing tube 1 which may, for example, take the form of a kinescope. The operation of a kinescope is well described in detail in an article by Dr. V. K. Zworykin entitled "Description of an experimental television system and kinescope" in the "Proceedings of the Institute of Radio Engineers," volume 21, No. 12, December 1933. The image tube 1 contains an electron gun 3 and a control electrode 5 which develops a modulated electron ray which is directed toward the target area or image element 7.

Although the practice of this invention is equally applicable to the transmitter and, of course, must be in order to provide synchronism between transmitter and receiver, a description of its operation will be limited to a receiving system for simplicity. In a transmission system, the image element 7 would take the form of a light sensitive mosaic electrode of a transmitting tube which may, for example, take the form of an image iconoscope. The image orthicon camera is shown and described in an article entitled "Image orthicon camera" by R. D. Kell and G. C. Sziklai in "RCA Review" for March, 1946.

Horizontal deflecting coils 9 and vertical deflecting coils 11 provide the deflection of the electron ray beam necessary to scan the image element 7. A suitable beam deflection yoke is shown and described in U. S. patent to A. Blain, No. 2,236,498, dated April 1, 1941.

In accordance with a preferred form of the invention illustrated in Figure 1, the scanning pattern may, for example, start at point 13 to form one series of substantially parallel paths to end at point 15 at the bottom of the target area or image raster area 7. It will be seen that relatively few trasverses have been completed by the time the electron beam reaches the bottom of the image raster area or element 7. When the electron beam has arrived at point 15, it is deflected vertically to a point 17, where it commences another series of traversals of substantially parallel paths and interlaced with respect to the first series. Upon the arrival of the beam at point 19 at the bottom of the image raster area 7, the beam is again vertically deflected to a point 21 where it again starts another series of substantially parallel paths, also interlaced with respect to the first two series of parallel paths. This action is continuous.

Such a scanning pattern may be produced by employing a vertical sawtooth wave generator 23 and a horizontal sawtooth wave generator 25 which may, for example, take the form of the deflection systems shown and described in the U. S. patent to W. A. Tolson et al., No. 2,101,520, dated December 7, 1937.

The scanning pattern illustrated in Figure 1 may, for example, be obtained by providing a television receiver 27, which furnishes the synchronizing signal in conjunction with a 60 cycle per second commercial source 29 to drive an oscillator 31 which produces an alternating current frequency of 45,000 cycles per second. The 45,000 cycle per second frequency is reduced to 15,000 cycles per second in element 33 which may, for example, take the form of a multivibrator circuit designed to reduce by one-third an applied alternating current signal. The 15,000 cycle per second signal is applied to the vertical sawtooth wave generator 23.

A portion of the energy from oscillator 31 is applied to converter 35, wherein it is combined with the 60 cycle per second energy from the commercial power source 29 and applied to the horizontal sawtooth wave generator 25. The 45,000 cycle and 15,000 cycle oscillators may be synchronized directly from the receiver by suitable synchronizing pulses received from the transmitter.

Turning now to Figure 2, there is shown the application of the scanning pattern illustrated in Figure 1 to the reproduction of television images in their natural color. The image raster area 7 of Figure 2 is scanned and is in a series of substantially parallel paths starting at point 13 in a manner similar to that shown and described in Figure 1. After the completion of one series of parallel paths, the scanning operation repeats with another series of parallel paths starting at point 17. A multicolor filter disk 41 is provided with alternate sections having, for example, the three component colors red at position 43, green at position 45, blue at position 47, and repeating with red at position 49, green at position 51, and so on. The color filter 41 is suitably rotatable in the direction shown by the arrow about its axis 53.

By rotating color filter 41 at a rate such that the position of each series of traversals will be at substantially the same position in each of the color sections, there will be provided a composite image of the three component colors.

It will be seen that a drum type or a ribbon type filter may be substituted for the disk type color filter 41 illustrated in Figure 2.

Turning now to Figure 3, there is shown a ribbon or drum type color filter employed in conjunction with another form of this invention wherein a plurality of groups of component color filters are simultaneously positioned adjacent the image element 7. It will be seen that, whereas there is a maximum of three complete traversals of the electron beam on the image raster area 7 shown in the form of the invention illustrated in Figure 2, there is a maximum of five complete traversals by the electron beam on the image raster area 7 shown in Figure 3 before another series of traverses is begun. In accordance with the form of the invention shown in Figure 3, the vertical scanning frequency is approximately ⅕ the horizontal frequency, thus producing a multiple diagonal scan in which five complete diagonal scanning lines follow each other, equally divided and in substantially parallel paths down the image raster area 7 in one vertical scan. The scan then returns to the top of the image raster area 7 and scans immediately under the previous five lines, and so on until, for example, 539 lines have been scanned in $^1/_{60}$ second. One of the five lines is always divided, a portion of it being in one corner, and the remainder being in the opposite corner. There are therefore six lines on the image raster area 7 almost simultaneously. The lines are behind red, green and blue filters on the filter element 55 which moves in the direction indicated by the arrow such that each filter element advances one segment in $^1/_{60}$ second. For purposes of example, the horizontal frequency for this particular illustration may be 32,340 cycles per second, and the vertical frequency may be 6,480 cycles per second, which is ⅕ of 32,340 plus 60, the 60 cycles being the "frame" frequency.

While ⅕ is given as an example, any other number, such as $^1/_3$, $^1/_{15}$, etc., may be used.

The entire area may, for example, be scanned with one-half of the desired number of lines, and then the remaining spaces may be filled in during the next succeeding scanning operation. If the area repetition rate is over 60 cycles, however, interlace may be destroyed by 60 cycle hum, in accordance with the explanation given above.

The practice of this invention is not particularly limited to the reproduction of television images in their natural color, but may also be used for black and white scanning with interlaced scanning giving lower frame frequencies and more scanning lines. The system is easily "flexible," that is, the pattern may be changed from a standard system of scanning and frame frequencies to more lines and lower frame frequencies, with only minor changes in the scanning speeds which could be followed easily by the receiving system.

Figure 4:
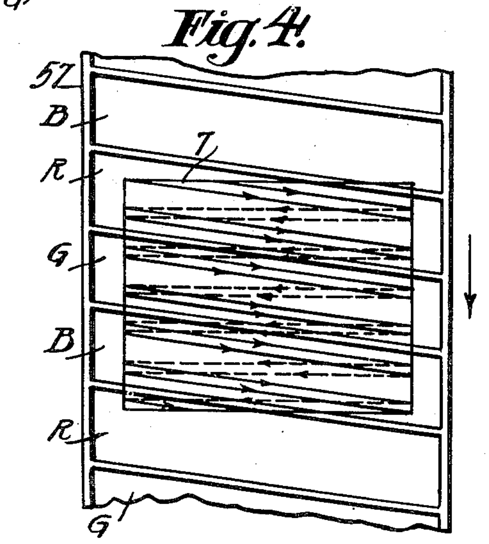
Figure 4 represents schematically still another preferred form of this invention, also employing a drum or ribbon type color filter.

In Figure 4 there is shown still another form of this invention wherein the image raster area 7 is scanned with a pattern similar to that shown in Figure 3, but the filter element 57 contains red, green and blue sections, each covering an area equal to the area occupied by at least two traversals of the scanning beam. The direction of movement of the filter element 57 is shown by the arrow. The rate of movement is also such that the traverse of any one series of parallel scanning paths occupies substantially the same relative position with respect to the individual component color sections as does any of the other associated series of parallel scanning paths.

Although the form of the invention illustrated in Figure 4 shows only two traverses in each color section, a greater number of traverses may be provided.

In each form of this invention shown and described above, the color filter element has been mounted moveable with respect to the image element. In some television systems it may be desirable that the color filter element remain stationary during operation. Such a system is shown and described in U. S. Patent No. 2,518,199, issued to George C. Sziklai on August 8, 1950.

Having thus described the invention, what is claimed is:

1. In a television system of the type employing a cathode ray tube having a target area whereupon an image is developed, a color filter having a plurality of different component color sections, said color filter rotatably positioned so that at least one each of said different color sections are adjacent said target area at any one time, a deflection system arranged in cooperative relationship with said cathode ray tube for causing the developed ray to traverse the target area along a field of substantially parallel lines, means to cause said deflection system to produce at the completion of a predetermined number of lines of traversal additional fields of substantially parallel lines interlaced with respect to the first fields of parallel lines until substantially the total target area has been scanned, and means for displacing the color filter across said target area in the same direction and at a rate equal to the displacement on said target area of each of said fields with respect to the next previous field.

2. In a television system of the type employing a cathode ray tube having a raster area whereupon an image is developed, a color filter having a plurality of different component color sections, an optical color path through at least one each of said different color sections and intersecting said raster area, a deflection system arranged in cooperative relationship with said cathode ray tube for causing the developed ray to traverse the raster area along a series of substantially parallel paths, means to cause said deflection system to produce at the completion of a predetermined number of parallel paths of traversal additional series of substantially parallel paths interlaced with respect to the first series of parallel paths until substantially the total raster area has been scanned, and means for simultaneously moving the intersection of a plurality of different component color optical color paths over said raster area in the same direction and at a uniform rate equal to the lateral displacement on said raster area of a traverse in each of said series with respect to the corresponding traverse of the next previous series.

3. In a natural color television system of the type employing a cathode ray tube having an image element, a color filter adjacent to and mounted moveably in a plane substantially parallel with the plane of said image element and having at least one section of each of the three different component colors, an optical color path through at least one each of said different component color sections and intersecting said image element, a deflection system arranged in cooperative relationship with said cathode ray tube for causing the developed ray to traverse the image element along a series of substantially parallel paths, means to cause said deflection system to produce at the completion of a predetermined number of parallel paths of traversal in the intersections of said image element with all said component color optical paths additional series of substantially parallel paths interlaced with respect to the first series of parallel paths until substantially the total area of the image element has been scanned, and means for displacing the intersection of said optical color paths with said image element across said image element in the same direction and at a rate equal to the displacement on said image element of each of said series of parallel paths with respect to the next previous series of parallel paths.

4. In a natural color television system of the type employing a cathode ray tube having an image element, a color filter having a plurality of different component color sections, an optical color path through at least one of each of said different color sections and intersecting said image element at one time, a deflection system arranged in cooperative relationship with said cathode ray tube for causing the developed ray to traverse the image element along a series of substantially parallel paths, means to cause said deflection system to produce at the completion of a predetermined number of parallel paths of traversal additional series of substantially parallel paths interlaced with respect to the first series of parallel paths until substantially the total area of the image element has been scanned, and means for moving said color filter at a rate such that the corresponding ray traverses of each series lie in substantially the same position in the intersection of the color path and said image element.

5. In a natural color television system of the type employing a cathode ray tube having an image element, a color filter having a plurality of different component color sections, an optical color path through at least one each of said different color sections and intersecting said image element, a deflection system arranged in cooperative relationship with said cathode ray tube for causing the developed ray to traverse the image element along a series of substantially parallel paths, and wherein said deflection system is also arranged that there is more of said series of parallel paths than there are parallel paths in each of said series, means to cause said deflection system to produce at the completion of a predetermined number of parallel paths of traversal additional series of substantially parallel paths interlaced with respect to the first series of parallel paths until substantially the total area of the image element has been scanned, and means for moving said color filter at a rate such that the first traverse of each of said series is positioned at about the same plane in the intersection of a color path and said image element.

6. In a natural color television system of the type employing a cathode ray tube having an image element, a color filter having a plurality of different component color sections, an optical color path through at least one each of said different color sections and intersecting said image element, a deflection system arranged in cooperative relationship with said cathode ray tube for causing the developed ray to traverse the image element along a series of substantially parallel paths, one only of said ray traverses of each series in each of said optical color paths at the intersection of said optical color paths with said image element, means to cause said deflection system to produce at the completion of a predetermined number of parallel paths of traversal additional series of substantially parallel paths interlaced with respect to the first series of parallel paths until substantially the total area of the image element has been scanned, and means for moving said color filter at a rate such that the first traverse of each of said series is positioned at about the same plane in the intersection of said color path and said image element.

7. In a natural color television system of the type employing a cathode ray tube having an image element, a color filter having a plurality of different component color sections, an optical color path through at least one each of said different color sections and intersecting said image element, a deflection system arranged in cooperative relationship with said cathode ray tube for causing the developed ray to traverse the image element along a series of substantially parallel paths, two only of said ray traverses in each of said optical color paths at the intersection of said optical color paths with said image element, means to cause said deflection system to produce at the completion of a predetermined number of parallel paths of traversal additional series of substantially parallel paths interlaced with respect to the first series of parallel paths until substantially the total area of the image element has been scanned, and means for moving said color filter at a rate such that the first traverse of each of said series is positioned at about the same plane in the intersection of said color path and said image element.

8. In a natural color television system of the type employing a cathode ray tube having an image element, a color filter having a plurality of different component color sections, an optical color path through two each of said different color sections and intersecting said image element at one time, a deflection system arranged in cooperative relationship with said cathode ray tube for causing the developed ray to traverse the image element along a series of substantially parallel paths, means to cause said deflection system to produce at the completion of a predetermined number of parallel paths of traversal additional series of substantially parallel paths interlaced with respect to the first series of parallel paths until substantially the total area of the image element has been scanned, and means for moving the intersection of said optical color paths with said image element in the same direction and at a uniform rate equal to the lateral displacement on said image element of a traverse in each of said series with respect to the corresponding traverse of the next previous series.

9. In a natural color television system of the type employing a cathode ray tube having an image area, a color filter adjacent to and mounted moveably in a plane substantially parallel with the plane of said image area and having at least one section of each of the three different component colors, a deflection system arranged in cooperative relationship with said cathode ray tube for causing the developed ray to traverse the image area along a series of substantially parallel paths, means to cause said deflection system to produce at the completion of a predetermined number of parallel paths of traversal additional series of substantially parallel paths interlaced with respect to the first series of parallel paths until substantially the total area of the image area has been scanned, the position of at least one of said complete ray traverses of each series adjacent one of said sections of each of the three different component colors, and means for displacing the intersection of said optical color paths with said image area across said image area in the same direction and at a rate equal to the displacement on said image area of each of said series of parallel paths with respect to the next previous series of parallel paths.

10. In a television system of the type employing a cathode ray tube having an image element, a color filter having a plurality of different component color sections, an optical color path through at least one each of said different color sections and intersecting said image element, a deflection system arranged in cooperative relationship with said cathode ray tube for causing the developed ray to traverse the image element along a series of substantially parallel paths, means to cause said deflection system to produce at the completion of a predetermined number of parallel paths of traversal additional series of substantially parallel paths interlaced with respect to the first series of parallel paths until substantially the total area of the image element has been scanned, and wherein each ray traverse of one series falls immediately adjacent the corresponding ray traverse of the next preceding series, means for displacing the intersection of said optical color paths with said image element across said image element in the same direction and at a rate equal to the displacement on said image element of each of said series of parallel paths with respect to the next previous series of parallel paths, and means for superimposing said optical paths to form a natural color image.

11. In a television system of the type employing a cathode ray tube having an image element, a color filter having a plurality of different component color sections, an optical color path through at least one each of said different color sections and intersecting said image element, a deflection system arranged in cooperative relationship with said cathode ray tube for causing the developed ray to traverse the image element along a series of substantially parallel paths, means to cause said deflection system to produce at the completion of a predetermined number of parallel paths of traversal additional series of substantially parallel paths interlaced with respect to the first series of parallel paths until substantially the total area of the image element has been scanned, means for displacing the intersection of said optical color paths with said image element across said image element in the same direction and at a rate equal to the displacement on said image element of each of said series of parallel paths with respect to the next previous series of parallel paths, and wherein said deflection system is also arranged that there is more of said series of parallel paths than there are parallel paths in each of said series.

12. In a natural color television system of the type employing a cathode ray tube having an image element, a color filter having a plurality of different component color sections, an optical color path through at least one each of said different color sections and intersecting said image element, a deflection system arranged in cooperative relationship with said cathode ray tube for causing the developed ray to traverse the image element along a series of substantially parallel paths, one only of said complete ray traverses of each series in each of said optical color paths at the intersection of said optical color paths with said image element, means to cause said deflection system to produce at the completion of a predetermined number of parallel paths of traversal additional series of substantially parallel paths interlaced with respect to the first series of parallel paths until substantially the total area of the image element has been scanned, and means for moving said color filter at a rate such that the first traverse of each of said series is positioned at about the same plane in the intersection of said color path and said image element.

13. In a television receiving system of the type employing a cathode ray tube having an image element, a color filter having a plurality of different component color sections, an optical path through at least one each of said different color sections and intersecting said image element, a deflection system arranged in cooperative relationship with said cathode ray tube for causing the developed ray to traverse the image element along a series of substantially parallel paths, means to cause said deflection system to produce at the completion of a predetermined number of parallel paths of traversal additional series of substantially parallel paths interlaced with respect to the first series of parallel paths until substantially the total area of the image element has been scanned, means for displacing the intersection of said optical color paths with said image element across said image element in the same direction and at a rate equal to the displacement on said image element of each of said series of parallel paths with respect to the next previous series of parallel paths, and means for superimposing said optical paths to form a natural color image.

14. In a television transmitting system of the type employing a cathode ray tube having an image element, a color filter having a plurality of different component color sections, an optical path through at least one each of said different color sections and intersecting said image element, a deflection system arranged in cooperative relationship with said cathode ray tube for causing the developed ray to traverse the image element along a series of substantially parallel paths, means to cause said deflection system to produce at the completion of a predetermined number of parallel paths of traversal additional series of substantially parallel paths interlaced with respect to the first series of parallel paths until substantially the total area of the image element has been scanned, means for displacing the intersection of said optical color paths with said image element across said image element in the same direction and at a rate equal to the displacement on said image element of each of said series of parallel paths with respect to the next previous series of parallel paths, and means for deriving said optical color paths from an object to be televized.

15. In a television system of the type employing a cathode ray tube having an image element, a color filter having a plurality of different component color sections, an optical color path through at least one each of said different color sections and intersecting said image element, a deflection system arranged in cooperative relationship with said cathode ray tube for causing the developed ray to traverse the image element along a series of substantially parallel paths, means to cause said deflection system to produce at the completion of a predetermined number of parallel paths of traversal additional series of substantially parallel paths interlaced with respect to the first series of parallel paths until substantially the total area of the image element has been scanned and wherein there are no more than three traverses in each series of parallel paths, and means for displacing the intersection of said optical color paths with said image element across said image element in the same direction and at a rate equal to the displacement on said image element of each of said series of parallel paths with respect to the next previous series of parallel paths.

16. In a television system of the type employing a cathode ray tube having an image element, a color filter having a plurality of different component color sections, an optical color path through at least one each of said different color sections and intersecting said image element, a deflection system arranged in cooperative relationship with said cathode ray tube for causing the developed ray to traverse the image element along a series of substantially parallel paths, means to cause said deflection system to produce at the completion of a predetermined number of parallel paths of traversal additional series of substantially parallel paths interlaced with respect to the first series of parallel paths until substantially the total area of the image element has been scanned and wherein there are no more than five traverses in each series of parallel paths, and means for displacing the intersection of said optical color paths with said image element across said image element in the same direction and at a rate equal to the displacement on said image element of each of said series of parallel paths with respect to the next previous series of parallel paths.

KARL R. WENDT.

REFERENCES CITED

The following references are of record in the file of this patent:

UNITED STATES PATENTS

| Number | Name | Date |
|---|---|---|
| 2,200,285 | Lorenzen | May 14, 1940 |
| 2,294,820 | Wilson | Sept. 1, 1942 |
| 2,337,980 | Du Mont | Dec. 28, 1943 |
| 2,375,966 | Valensi | May 15, 1945 |
| 2,389,646 | Sleeper | Nov. 27, 1945 |
| 2,413,075 | Schade | Dec. 24, 1946 |
| 2,435,963 | Goldmark | Feb. 17, 1948 |
| 2,452,293 | De Forest | Oct. 26, 1948 |